United States Patent

Shoda et al.

[15] 3,670,012
[45] June 13, 1972

[54] PROCESS FOR PRODUCING ACRYLIC ESTER

[72] Inventors: Shichiro Shoda; Nobuo Ito; Toshiro Miki, all of Nagoya, Japan

[73] Assignee: Toagosei Chemical Industry Co., Ltd., Tokyo, Japan

[22] Filed: May 27, 1969

[21] Appl. No.: 828,115

[52] U.S. Cl. ....................................260/486 AC, 260/498
[51] Int. Cl. ............................................C07c 69/54
[58] Field of Search............................260/486 AC

[56] References Cited

UNITED STATES PATENTS 2,886,591  5/1959  Lautenschlager et al. ..............260/486
2,881,205  2/1957  Dakli et al. ..........................260/486

*Primary Examiner*—Lewis Gotts
*Assistant Examiner*—Paul J. Killos
*Attorney*—Karl W. Flocks

[57] ABSTRACT

A process for producing acrylic ester, which comprises reacting with each other in liquid phase acetylene, carbon monoxide, nickel carbonyl, an acid and an alcohol, characterized in that the concentration of nickel carbonyl in the reaction liquid is 10 to 40 percent by weight and that the reaction is 10° to 30° C.

In accordance with the present process, it has been found that the amount of propionic ester produced by side reaction becomes conspicuously small.

8 Claims, 1 Drawing Figure

PATENTED JUN 13 1972 3,670,012
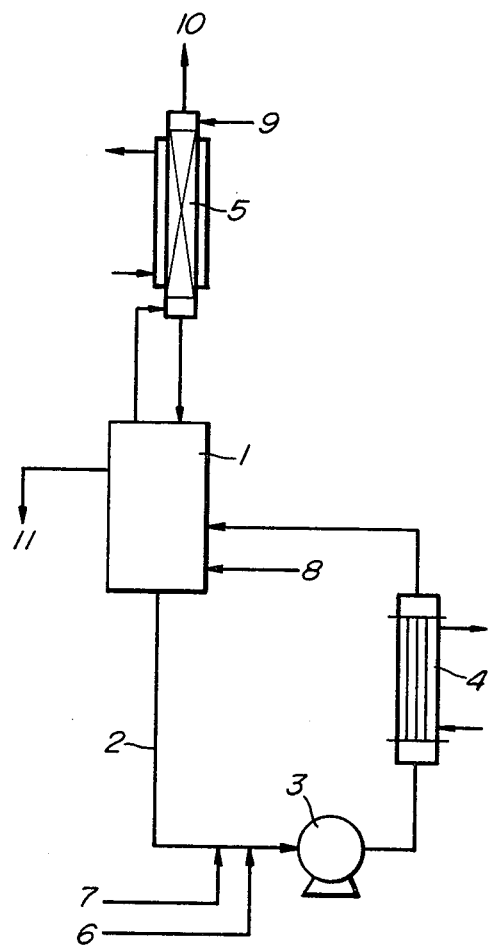
INVENTORS
Shichiro Shoda
Nobuo Ito
Toshiro Miki
BY
ATTORNEY

PROCESS FOR PRODUCING ACRYLIC ESTER

BACKGROUND OF THE INVENTION

1. Field of the Invention

The present invention relates to a process for producing acrylic ester, and particularly it relates to an improvement in a process for producing acrylic ester in accordance with the so-called improved Reppe process.

2. Description of the Prior Art

The production of acrylic ester in accordance with the improved Reppe process is presented, for example, by the following formulas (1) and (2):

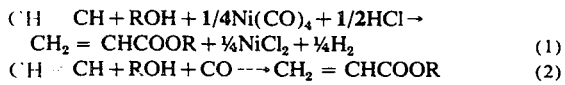

$$CH_2 = CHCOOR + \tfrac{1}{4}NiCl_2 + \tfrac{1}{2}H_2 \quad (1)$$
$$CH \equiv CH + ROH + CO \longrightarrow CH_2 = CHCOOR \quad (2)$$

(wherein R in the above formulas represents an alkyl group.)

Acrylic ester is produced by the stoichiometric reaction of the formula (1) and the catalytic reaction of the formula (2) wherein a complex compound of nickel carbonyl produced in the formula (1) is used as a catalyst. At the same time, however, propionic ester indicated in the following formula (3) is by-produced by the action of hydrogen produced in the formula (1). While, since the boiling point of the byproduct is adjacent to that of acrylic ester, said byproduct cannot be separated therefrom in the subsequent purification step. As the result, the purity of acrylic ester is lowered and the commercial value thereof is reduced.

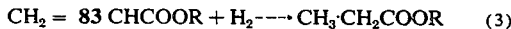

As a process for reducing said by-production of propionic ester, there is available, for example, a process for supplying acetylene in an amount excessive to an amount of carbon monoxide in the course of reaction. However, said process is not advantageous economically, and moreover, in said process, the production of condensates such as benzene and high boiling materials such as cyclohexene-dicarboxylic ester and β-vinyl propionic ester cannot be avoided and the amount of by-production of propionic ester cannot be reduced to be 1 percent or less.

An object of the present invention is to provide a process for producing acrylic ester, characterized in the extremely small amount of by-production of propionic ester and benzenes, in the small consumption amount of nickel carbonyl and in the suitability for the continuous operation thereof.

SUMMARY OF THE INVENTION

In accordance with the present invention, it has been found in the process for producing acrylic ester by reacting with each other acetylene, carbon monoxide, nickel carbonyl, an acid and an alcohol in liquid phase that a concentration of nickel carbonyl should be set at 10 to 40 percent by weight, preferably 15 to 30 percent by weight, based on the reaction liquid and a reaction temperature should be defined to 10° to 30° C., preferably 15° to 25° C.

For the purpose of inhibiting the production of propionic ester through side reaction, it is preferred, as is obvious from the foregoing reaction formula (3), to increase the reaction of formula (2), namely it is desirous in carrying out the reaction to increase the proportion of the reaction of formula (2) by feeding much amount of carbon monoxide from outside and on the other hand, to decrease the proportion of the reaction of formula (1) by reducing the feeding amount of carbon monoxide from nickel carbonyl. However, too much reduction in the proportion of the reaction of formula (1) brings about the unbalanced reaction of formula (2) which results in the reduction in the rate of reaction performance and further in the whole step of reaction.

The feeding of carbon monoxide from nickel carbonyl used in the present invention is carried out by adding an acid to the reaction system in such a state that the concentration of nickel carbonyl in the reaction liquid is elevated up to 10 to 40 percent by weight, particularly 15 to 30 percent by weight. According to said procedure, n amount of the acid added to the reaction system is possible to reduce extremely and at the same time, a consumption amount of nickel carbonyl becomes conspicuously small, which readily result in 85 percent or more of the rate of reaction of carbon monoxide which is a parameter showing the high level of production technique of acrylic ester in accordance with the improved Reppe process.

As the result, the generation of hydrogen has been largely reduced, the production amount of propionic ester has been decreased without the use of excessive amount of acetylene to carbon monoxide, and further the trouble in the by-production of benzole and various kinds of high boiling materials has been dissolved.

It has also been found that these effects become conspicuously remarkable by lowering the reaction temperature to 10° to 30° C., in particular 15° to 25° C.

The reaction for producing acrylic ester in accordance with the improved Reppe process is often intermitted by various causes and in particular, the operation at a lower temperature requires a high operation technique.

However, said problem can almost be dissolved by the operation carried out under a high concentration of nickel carbonyl.

The present process is a process capable of reducing a using amount of acid, namely a process wherein the production of a nickel salt originated from the reaction of formula (1) is small and which is suitable for the continuous operation for the reason that there is no fear of causing the blockade of pipings surrounding a reactor by said nickel salt. Further, the present process may be operated extremely advantageous in accordance with a process disclosed in detail in the specification of British Pat. No. 976,766 which has been invented by the present inventors.

In addition, the reaction liquid obtainable in accordance with the present process contains a considerable amount of nickel carbonyl. However, said nickel carbonyl can be removed very simply in accordance with the process of Japanese Pat. No. 484,139 wherein the reaction liquid is distilled while introducing carbon monoxide into the reaction liquid under conditions that $\sqrt[4]{\text{nickel carbonyl partial pressure (atm)}}$/carbon monoxide partial pressure (atm) is 10 or less and a temperature is 10° to 110° C. The subsequent purification of acrylic ester may be operated in a usual manner.

The operation of the present invention may be carried out generally under normal pressure or under a pressure slightly increased, but there are some cases where the operation is advantageous to perform under a pressure of 2 kg./cm² or more.

The alcohols which may be used in the present process include saturated aliphatic primary, secondary, and tertiary alcohols and unsaturated aliphatic alcohols, cyclic alcohols and polyhydric alcohols which have carbon atoms of one to 18. As examples of these alcohols, there may be mentioned methanol, ethanol, propanol, isopropanol, butanol, isobutanol, pentanol, hexanol, 3-methyl pentanol, octanol, iso-octanol, 2-methyl hexanol-2, cyclo-hexanol, methyl cyclo-hexanol, allyl alcohol, ethylene glycol, propylene glycol and the like.

The acids usable in the present process include hydrochloric acid, acetic, acid, acrylic acid, methacrylic acid, butyric acid and the like. However, the most preferred acid is hydrochloric acid.

Any of the acetylene and carbon monoxide which may be used in the present process is suitable t contain a small amount of oxygen, in preferable contain scarcely oxygen, and is required not to contain relatively a lower valent compound of phosphorus and arsenic and scarcely contain sulfur.

Definitions of terms used in the present specification will be illustrated hereinbelow:

Rate of utilization of acetylene =

$$\frac{\text{Total amount of reacted carbon monoxide (mole)}}{\text{Amount of fed acetylene (mole)}} \times 100$$

Rate of reaction of carbon monoxide =

$$\frac{\text{Reacted amount of carbon monoxide (mole)}}{\text{Total amount of reacted carbon monoxide (mole)}} \times 100$$

Molar ratio =

$$\frac{\text{Amount of reacted acetylene (mole)}}{\text{Amount of reacted hydrogen chloride (mole)}}$$

BRIEF DESCRIPTION OF THE DRAWING

The accompanying drawing shows an example of apparatus which may be used to carry out the present process.

The present invention will be further explained hereinafter with reference to examples and comparative examples.

EXAMPLE 1

A reaction in an apparatus shown in the annexed drawing is carried out by feeding nickel carbonyl through a pipe 6, hydrogen chloride through a pipe 7 and acetylene-carbon monoxide mixed gas through a pipe 8 into a reaction liquid-circulating pipe 2 wherein the reaction liquid is circulated by means of a reaction liquid-circulating pump 3, and simultaneously feeding an alcohol through a pipe 9 into a washer 5 for washing unreacted gas and inactive gas separated by a waste gas-separator 1.

During the reaction, the reaction liquid is maintained at a definite temperature by a cooler 4, and the produced liquid obtained by the reaction and the waste gas are withdrawn through a pipe 11 and a pipe 10 respectively to outside of the system.

Eighty-eight kg. of ethanol and 132 kg. of ethyl acrylate are fed in advance into the apparatus adopting the afore-described reaction procedure, and a circulating amount thereof is set at 60 m³/hr. by starting the circulating pump. Forty-five kg. of nickel carbonyl and 0.385 m³ of hydrogen chloride were fed thereinto and heated up to 30° C. and subsequently, each raw material component was fed thereinto in the following proportion:

| Acetylene: | 0.8 m³/hr. |
| Hydrogen chloride: | 0.5 m³/hr. |
| Nickel carbonyl: | 15 Kg./hr. |
| Methanol: | 16 Kg./hr. |

When commencing the feeding of these raw materials, the absorption of acetylene took place without delay to change a color of the reaction liquid into brown and the temperature began to rise. Immediately after commencing the reaction, the feeding amount of acetylene was increased to 4.0 m³/hr. and the feeding amount of methanol was increased to 22.6 kg./hr. Simultaneously, the feeding of carbon monoxide was commenced and increased gradually up to 2.85 m³/hr. in the course of 40 minutes. During said period, the reaction temperature was gradually lowered to 20° C. by regulating cooling water in the cooler.

In the foregoing stage, the molar ratio became to 8.0 and the rate of utilization of acetylene became to 95 percent. The molar ratio was thereafter raised up by reducing stepwise the feeding amount of hydrogen chloride every 1 hour. Thereby, the feeding amount of carbon monoxide was increased so as to always maintain the rate of utilization of acetylene at 95 percent. Further, the feeding amount of nickel carbonyl was regulated so as to maintain a nickel carbonyl concentration in the reaction liquid at 30 percent.

Thus, the stable reaction could be continued for more than 24 hours finally under conditions shown in a column of Example 1 in Table 1.

The rate of reaction of carbon monoxide in said case was 89.5 percent, and after continuing 24 hour run in said state, the reaction liquid was rectified in the presence of carbon monoxide gas to separate the unreacted alcohol, nickel carbonyl and high boiling materials, and the purified acrylic ester was separated.

Analyzing the purified acrylic ester in accordance with a gas chromatography, it was found that an amount of propionic ester in the total produced acrylic ester was 0.40 percent.

EXAMPLES 2 and 3, and Comparative EXAMPLES 1 to 4

Reactions were carried out in the same manner as in Example 1 except that kinds of raw material alcohols, feeding amounts of raw materials and reaction conditions were changed.

The results of said examples and comparative examples are summarizingly shown in Table 1.

From the results shown in Table 1, there is clearly recognized in the reaction applied by the present process a conspicuous improvement in the rate of reaction of carbon monoxide and the content of propionic ester in the product.

TABLE 1

|  | Example | | | Comparative example | | | |
|---|---|---|---|---|---|---|---|
|  | 1 | 2 | 3 | 1 | 2 | 3 | 4 |
| Feeding amount of raw material: | | | | | | | |
| Acetylene (N m.³/hr.) | 4.0 | 4.0 | 4.0 | 4.0 | 4.0 | 4.0 | 4.0 |
| Alcohol (kg./hr.) | ¹ 22.6 | ² 20.2 | ³ 28.6 | ¹ 22.6 | ¹ 22.6 | ² 20.2 | ⁴ 4.63 |
| Nickel carbonyl (kg./hr.) | 14.8 | 13.7 | 10.5 | 1.5 | 4.5 | 13.8 | 2.1 |
| Carbon monoxide (N m.³/hr.) | 3.40 | 3.45 | 3.41 | 3.30 | 3.36 | 3.42 | 3.12 |
| Hydrogen chloride (N m.³/hr.) | 0.200 | 0.195 | 0.216 | 0.308 | 0.222 | 0.211 | 0.400 |
| Reaction conditions: | | | | | | | |
| Concentration of nickel carbonyl (percent by weight) | 30 | 30 | 20 | 1 | 10 | 30 | 1 |
| Temperature (° C.) | 20 | 25 | 20 | 40 | 40 | 40 | 40 |
| Rate of reaction of carbon monoxide (mole percent) | 89.5 | 89.8 | 88.8 | 84.3 | 88.3 | 89.0 | 79.6 |
| Rate of utilization of acetylene (percent) | 95.0 | 96.0 | 96.1 | 97.9 | 95.1 | 96.1 | 98.0 |
| Molar ratio | 20.0 | 20.5 | 18.5 | 13.0 | 18.0 | 19.0 | 10.0 |
| Content of propionic ester in the product (percent by weight) | 0.40 | 0.42 | 0.43 | 1.80 | 1.18 | 1.05 | 2.50 |

¹ Ethyl alcohol.
² Methyl alcohol.
³ Isobutyl alcohol.
⁴ 2-ethyl hexyl alcohol.

While the above has been described in connection with preferred embodiments of this invention, it will be obvious to those skilled in the art that various changes and modifications may be made therein without departing from the invention, and it is aimed, therefore, to cover in the appended claims all such changes and modifications as falling within the true spirit and scope of this invention.

We claim:

1. In a process for producing an acrylic ester, which comprises reacting with each other in liquid phase: acetylene, carbon monoxide, hydrogen chloride, a saturated aliphatic primary alcohol having one to 18 carbon atoms and nickel carbonyl, the improvement wherein the concentration of nickel carbonyl in the reaction liquid is 15 to 40 percent by weight and the reaction temperature is 10° to 30° C.

2. A process in accordance with claim 1 wherein the acrylic ester is methyl acrylic ester.

3. A process in accordance with claim 1 wherein the acrylic ester is ethyl acrylic ester.

4. A process in accordance with claim 1 wherein the acrylic ester is butyl acrylic ester.

5. A process in accordance with claim 1 wherein the acrylic ester is 2-ethyl hexyl acrylic ester.

6. A process in accordance with claim 1 wherein the reaction is effected under a pressure between normal pressure and 2 kg/cm².

7. A process in accordance with claim 1 wherein the reaction temperature is in the range of 15° to 25° C.

8. A process in accordance with claim 1 wherein the concentration of nickel carbonyl is in the range of 15 to 30 percent by weight.

* * * * *